Aug. 28, 1956

H. GRÜNBAUM 2,760,379

MECHANISM FOR WINDING WEBS OR STRIPS

Filed Aug. 16, 1954

Inventor:

Heinrich Grünbaum

United States Patent Office 2,760,379
Patented Aug. 28, 1956

2,760,379

MECHANISM FOR WINDING WEBS OR STRIPS

Heinrich Grünbaum, Basel-Binningen, Switzerland, assignor to Stahlkontor G. m. b. H., Hameln (Weser), Germany Application August 16, 1954, Serial No. 449,918

Claims priority, application Switzerland August 19, 1953

3 Claims. (Cl. 74—368)

The object of the present invention is a gear for winding on webs of paper, textiles, foils, bands, cables, wires and other material issuing with a certain speed from machines, comprising a series of pairs of toothed wheels with increasing speed reduction ratio, capable of slipping and provided with free-wheel devices, which pairs engage successively in the transmission of power automatically when the speed of rotation of the output shaft, which is constantly decreasing as the diameter of the coil increases, has reached that ratio to the speed of rotation of the input shaft which corresponds to the transmission ratio of the pair of gears concerned.

Figure 1:
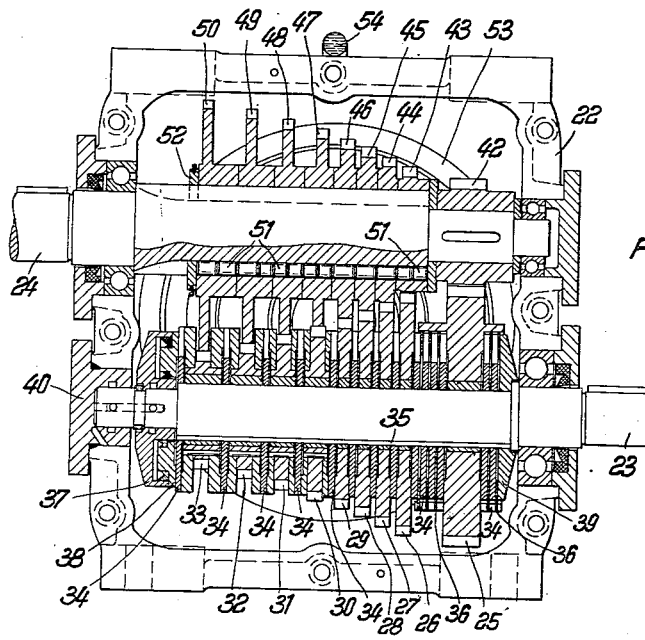
Figure 2:
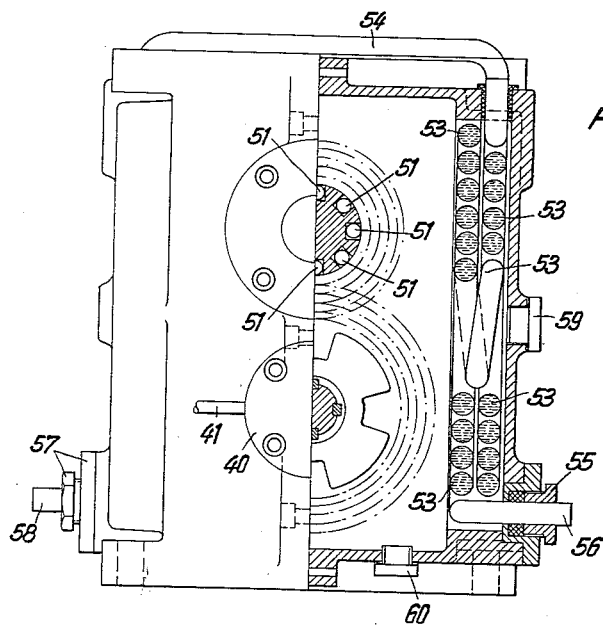

An example of embodiment is illustrated in the accompanying drawing wherein Figure 1 shows a diagrammatic longitudinal section through a gear with a series of friction arrangements, and Figure 2 shows a lateral elevation, with partial cross-section through the middle plane of the same gear.

In the illustrated construction an input shaft 23 and an output shaft 24 are mounted in a two-part housing 22. A series of gear wheels 25, 26, 27, 28, 29, 30, 31, 32, 33 is arranged on bronze bushes on the first shaft, so as to rotate freely about the shaft. Between the individual gear wheels there are friction plates 34 in each case, which are torsionally connected through the longitudinal splines 35 with the shaft 23. A plurality of such discs are associated with the first gear wheel 25, forming, in combination with the discs 36, a sort of multiple disc coupling. All the above-mentioned elements are axially displaceable on the shaft, and in their assembly form a pack capable of being pressed together. The pressure is produced by hydraulic means, oil under pressure being introduced into a cylinder 37, acting upon the piston 38 and effecting the pressing together of the pack against an end plate 39. The oil under pressure is supplied through the bearing bush 40, into which the supply pipe 41, coming from a pump with regulating valve or from a pressure cylinder, opens.

The counter-wheels 43, 44, 45, 46, 47, 48, 49, 50 are similarly loosely arranged on the output shaft 24. Between them and the shaft there are housed single clamping rollers 51, in recesses in this shaft. They act in a known manner as clamping rollers, when the gear wheels move in relation to the shaft in a certain direction of rotation, and as free-wheel arrangements on rotation in the opposite direction. The gear wheel 42 on the other hand is firmly keyed on to the shaft 24. The entire set of gear wheels is held and limited by a two-part end plate 52.

On commencement of the winding the pair of gears 25—42 takes over the entire load, since it possesses the smallest speed reduction ratio, and since the speed of rotation of the shaft 24 is at the maximum. When as a result of the growing bale wound the speed of rotation of the output shaft 24 decreases, the multiple disc coupling of the gear wheel 25 slips more and more. As soon as the decrease in speed of rotation has become so great that the ratio of speeds of rotation between shaft 23 and 24 is equivalent to the transmission ratio of the pair of gears 26—43, this pair of gears will also participate in the transmission of force, by engagement of the clamping rollers 51, with constantly increasing slip in relation to the shaft 23 or the friction plates 34. The torque transmitted by the pair of gears 26—43 is substantially smaller than the torque transmitted by the basic stage 25—42, since it possesses only two friction surfaces in contrast to the multi-surface multiple disc coupling of the basic stage. The torque of this first additional stage 26—43 is added to the basic stage, which always remains in the power transmission system. The more the speed of rotation of the output shaft drops, the more gear stages engage in the power transmission system, until finally all the gear wheels transmit their proportions of force from the shaft 23 to the shaft 24. In this state the maximum possible torque for the winding operation is achieved. The greatest slip here is to be registered in the basic stage 25—42 and the least in the end stage 33—50. With every stage the proportion of the torque measured on the shaft 24 increases, although the friction moments on the shaft 23 are the same with all additional stages. With a view to the necessary preceding of the winding on shaft by the gear, the interval between the basic stage and the first additional stage is greater than in the subsequent additional stages. The losses of this type of gear are calculated by addition of the individual stages, the proportion of loss being least with the last additional stages. In the example of embodiment one basic stage and eight additional stages are provided. The geometric stage interval is about 1:1.23 and the overall range produced for the increase of the diameter of the coil is calculated with about 1:6 to 1:7. A loss calculation produces an average efficiency of around 40%. However the energy converted into friction and heat is so great that in the case of relatively great winding outputs additional cooling becomes necessary. This extraneous cooling is provided, in the example as illustrated, in the form of double cooling spirals 53, which are built in in the interior of the gear housing to the right and left of the two shafts. The tube bend 54 connects the two double spirals. The cooling water is supplied to the tube end 56 sealed off by a stuffing box 55, while it flows away again through the pipe nozzle 58 sealed off by means of a stuffing box 57. The screw 59 is provided for filling with oil, and the screw 60 for letting off oil.

The gear wheels of the individual gear stages can be made of small dimensions, since in each case they have only to deliver fractions of the total torque to be transmitted. Therefore the gear is small, admittedly at the expense of efficiency.

The fundamental advantage of the object of the invention consists in that whereas the slip moment on the input shaft is kept constant, the moment at the output shaft increases completely automatically in accordance with the requirements of the winding operation, the total efficiency being substantially higher than with the known friction means, which work without gear shifting, and must be controlled for the purpose of increasing the winding moment.

What I claim is:

1. In an automatic variable transmission gear the combination of a housing containing lubricant, an input shaft extending within said casing, an output shaft extending within said casing parallel to said input shaft, a series of stepped driver gear wheels arranged for relative rotation on said input shaft, friction plates held against relative rotation on said input shaft and arranged intermediate said driver gear wheels, means pressing said driver gear wheels and said friction plates into mutual contact, a series of stepped counter gear wheels loose on said output shaft and each constantly meshing with one of said driver gear wheels, and free-wheel devices arranged one in each of said counter gear wheels and permitting said output shaft to rotate faster than the respective one of said counter gear wheels but preventing any one of said counter gear wheels from rotating faster than said output shaft.

2. In an automatic variable transmission gear, the combination as claimed in claim 1, comprising also a smallest counter gear wheel secured to said output shaft and meshing with the largest of said stepped driver gear wheels.

3. In an automatic variable transmission gear, the combination as claimed in claim 1, said means pressing said driver gear wheels and said friction plates into mutual contact comprising a hydraulic cylinder, a piston in said cylinder, and means for creating variable hydraulic pressure in said cylinder.

References Cited in the file of this patent

UNITED STATES PATENTS

| | | |
|---|---|---|
| 2,139,221 | Bronander | Dec. 6, 1938 |
| 2,185,602 | Metzler | Jan. 2, 1940 |
| 2,520,352 | Wuetig | Aug. 29, 1950 |
| 2,557,799 | Salmivuori | June 19, 1951 |